US009098375B2

(12) United States Patent
Narkinsky et al.

(10) Patent No.: US 9,098,375 B2
(45) Date of Patent: Aug. 4, 2015

(54) AUTOMATIC MANAGEMENT OF SOFTWARE PATCH INSTALLATION

(71) Applicant: Verizon Patent and Licensing Inc., Basking Ridge, NJ (US)

(72) Inventors: John P. Narkinsky, Leesburg, VA (US); Richard T. Williamson, Buford, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/138,824

(22) Filed: Dec. 23, 2013

(65) Prior Publication Data

US 2015/0178063 A1 Jun. 25, 2015

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
USPC ................................... 717/168–175; 709/203
IPC ......................................... G06F 8/61,8/65, 8/70
See application file for complete search history.

(56) References Cited

U.S. PATENT DOCUMENTS

| | | | | |
|---|---|---|---|---|
| 6,161,218 A | * | 12/2000 | Taylor ............................ | 717/174 |
| 7,203,723 B2 | * | 4/2007 | Ogawa .......................... | 709/203 |
| 7,251,812 B1 | * | 7/2007 | Jhanwar et al. ................ | 717/171 |
| 7,581,217 B2 | * | 8/2009 | Jhanwar et al. ................ | 717/168 |
| 7,676,803 B2 | * | 3/2010 | Zhao et al. ..................... | 717/168 |
| 7,735,078 B1 | * | 6/2010 | Vaidya ........................... | 717/171 |
| 7,831,966 B2 | * | 11/2010 | Costanza et al. ............... | 717/168 |
| 7,856,631 B2 | * | 12/2010 | Brodkorb et al. .............. | 717/177 |
| 7,873,959 B2 | * | 1/2011 | Zhu et al. ....................... | 717/172 |
| 7,937,697 B2 | * | 5/2011 | Alberti et al. .................. | 717/169 |
| 8,146,073 B2 | * | 3/2012 | Sinha ............................. | 717/170 |
| 8,171,465 B2 | * | 5/2012 | Kodaka et al. ................. | 717/168 |
| 8,174,217 B2 | * | 5/2012 | Zhang et al. ............. | 318/400.02 |
| 8,230,418 B2 | * | 7/2012 | Takatsu et al. ................. | 717/174 |
| 8,356,293 B1 | * | 1/2013 | Tormasov et al. ............. | 717/171 |

OTHER PUBLICATIONS

Vojnovic et al, "On the Effectiveness of Automatic Patching", ACM, pp. 41-50, 2005.*
Lin et al, "AutoPaG: Towards Automated Software Patch Generation with Source Code Root Cause Identification and Repair" ACM, pp. 329-340, 2007.*

(Continued)

*Primary Examiner* — Anil Khatri

(57) ABSTRACT

A device may receive information that identifies available patches that have been released by a software provider. The information may further identify dependencies between available patches. The device may receive information that identifies installed patches that have been installed on a particular device. The device may determine a set of patches to be installed on the particular device based on the available patches and the installed patches. The device may determine an installation order for installing the set of patches on the particular device. The installation order may be based on a dependency between at least two patches included in the set of patches to be installed. The device may cause installation of the set of patches on the particular device, in an order identified by the installation order, after determining the set of patches to be installed.

20 Claims, 12 Drawing Sheets

(56) References Cited

OTHER PUBLICATIONS

Marinescu et al, "KATCH: High-Coverage Testing of Software Patches", ACM pp. 235-245, 2013.*

Zhang et al,Desktop Software for Patch-Clamp Raw Binary Data Conversion and Preprocessing, ACM—Journal of Electrical and Computer Engineering, Hindawi Publishing Corporation, pp. 1-7, 2011.*

Oracle, "Oracle Technology Network Patching Center", http://www.oracle.com/technetwork/systems/patches/overview/index.html, Dec. 17, 2013, 2 pages.

Martin Paul, "PCA—Patch Check Advanced", http://www.par.univie.ac.at/solaris/pca/, Aug. 4, 2004, 2 pages.

* cited by examiner

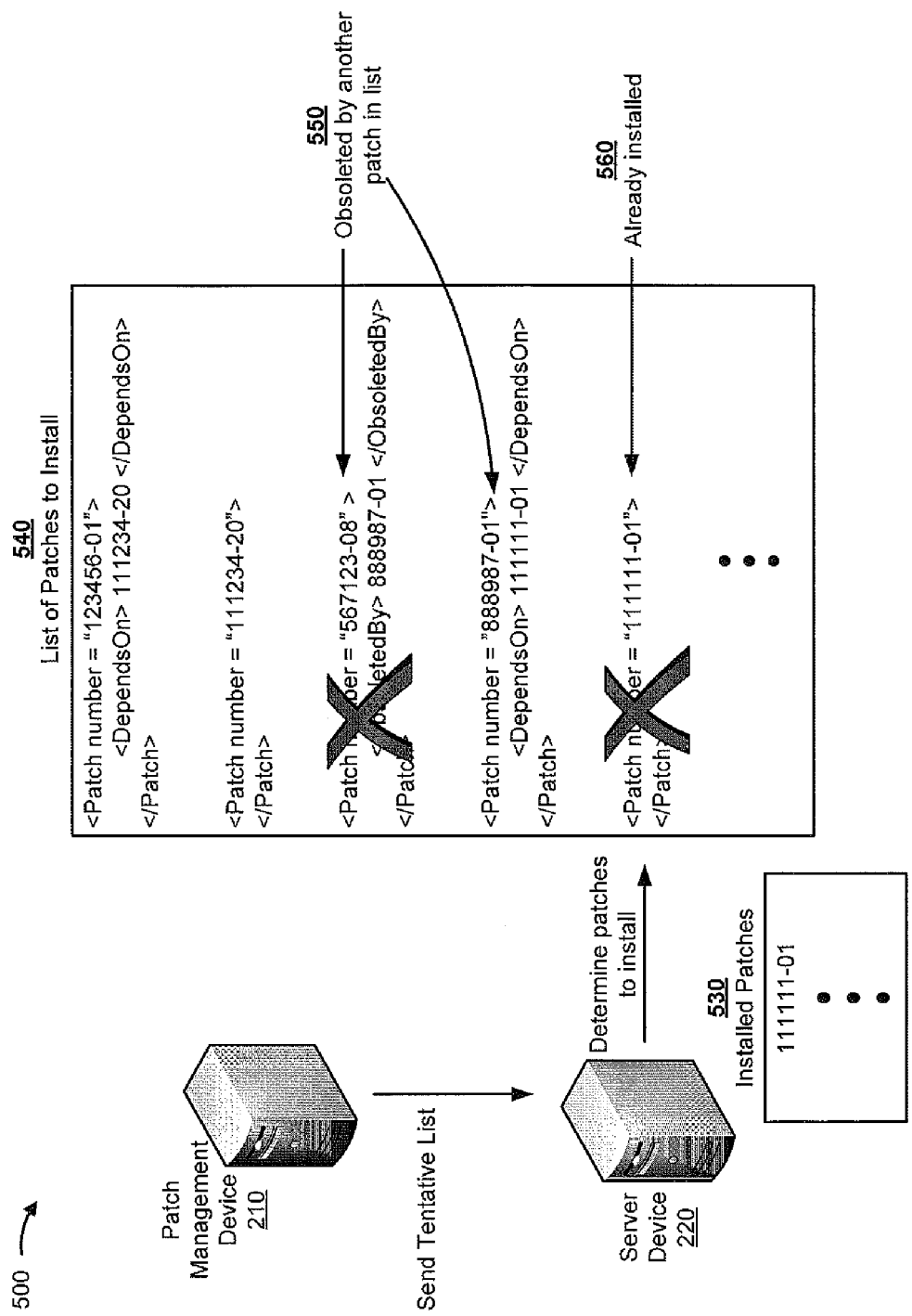

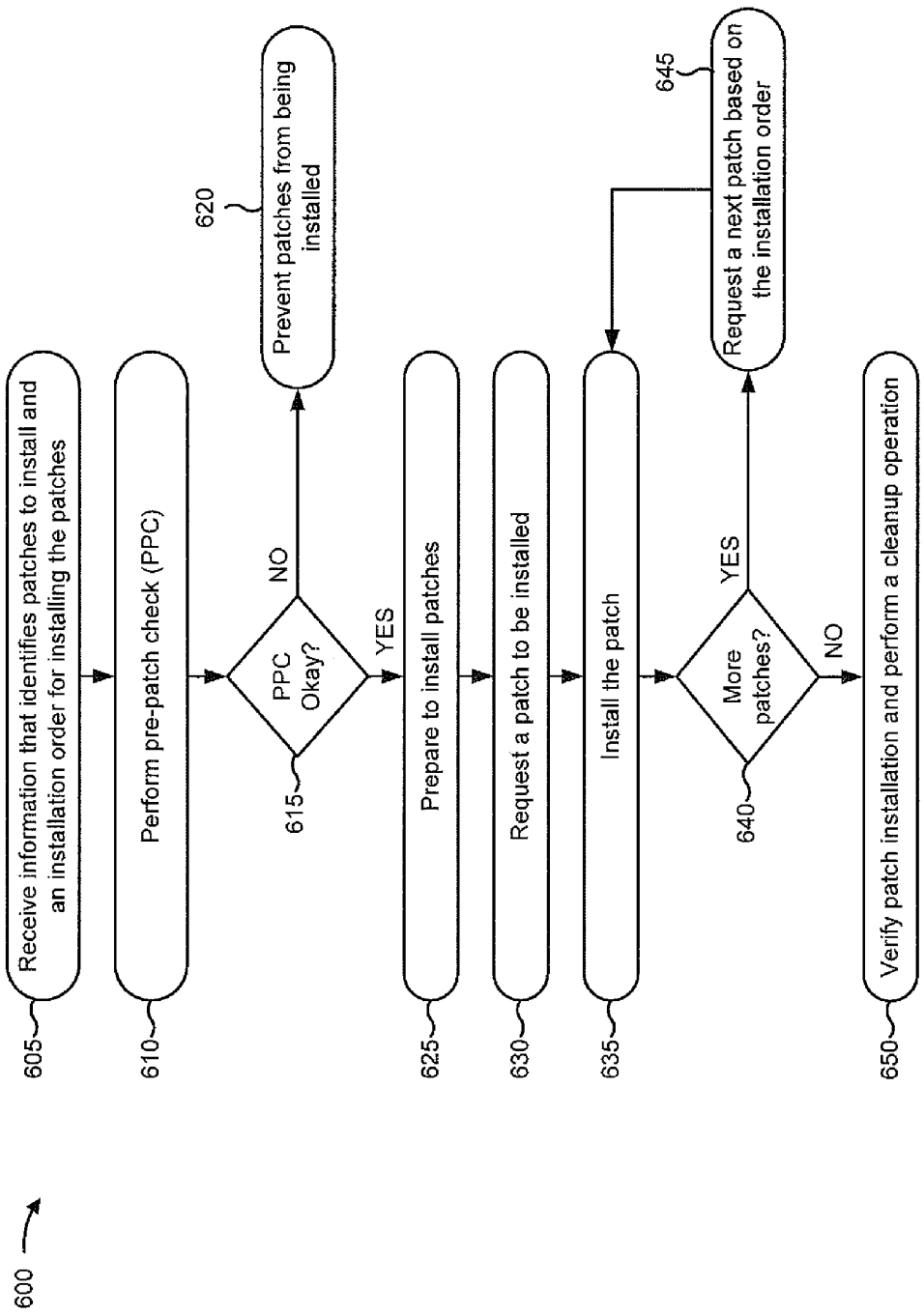

AUTOMATIC MANAGEMENT OF SOFTWARE PATCH INSTALLATION

BACKGROUND

A patch may refer to a piece of software designed to fix problems with, and/or to update, a computer progdxram. For example, a patch may fix a security vulnerability, may improve usability, may improve performance, and/or may fix other software bugs.

BRIEF DESCRIPTION OF THE DRAWINGS

FIGS. 5A-5C are diagrams of an example implementation relating to the example process shown in FIG. 4;

FIG. 6 is a flow chart of an example process for managing installation of patches.

DETAILED DESCRIPTION OF PREFERRED EMBODIMENTS

The following detailed description of example implementations refers to the accompanying drawings. The same reference numbers in different drawings may identify the same or similar elements.

Managing installation of software patches may be challenging, especially across many server devices that may have different software installed, different patches installed, different configurations, different operating systems, etc. Implementations described herein may assist in the automatic management of software patch installation.

Figure 1:
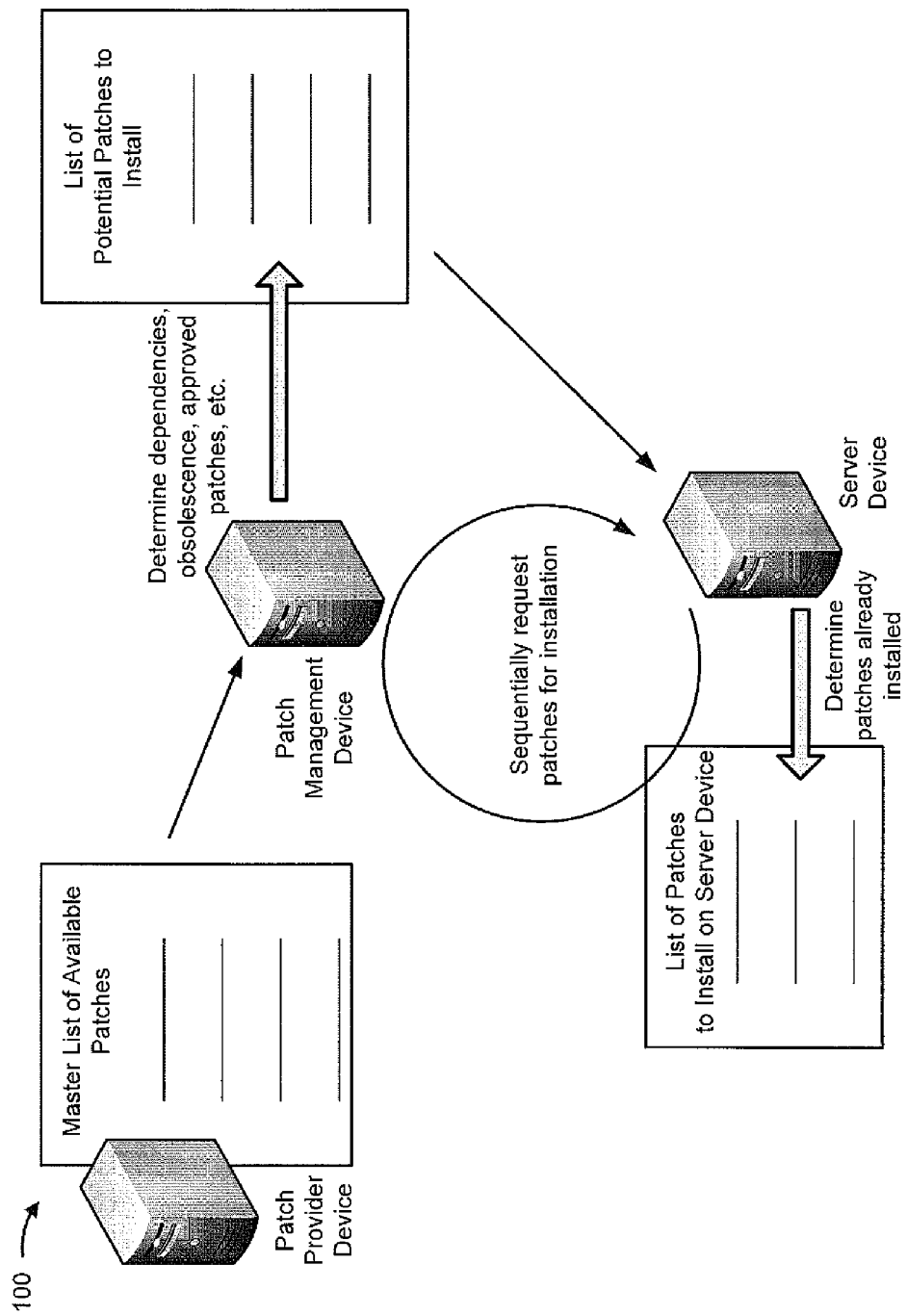
FIG. 1 is a diagram of an overview of an example implementation described herein.

FIG. 1 is a diagram of an overview of an example implementation 100 described herein. As shown in FIG. 1, a patch management device may obtain, from a patch provider device, a master list of available patches. The master list may identify patches that have been released by a patch provider (e.g., a software provider). The patch management device may also receive, from the patch provider device, information that identifies patch dependencies, patch obsolescence, etc. The patch management device may identify patch dependencies (e.g., indicating that a first patch should be installed before a second patch), may identify patch obsolescence (e.g., indicating that a first patch is rendered obsolete by a second patch), etc. As further shown, the patch management device may determine a list of patches to potentially be installed on a server device requiring patching. The patch management device may provide this list to the server device.

As further shown in FIG. 1, the server device may receive the list of potential patches to install, may determine patches already installed on the server device, and may use this information to determine a list of patches to install on the server device. Furthermore, the server device may determine an order in which the patches are to be installed. The server device may sequentially request the patches from the patch management device for installation on the server device. For example, the server device may download a first patch (e.g., from the patch management device or the patch provider device), may begin installing the first patch, and may download a second patch while the first patch is installing. The server device may continue to download and install patches in this manner until all patches, in the list of patches, have been installed.

In this way, the patch management device and the server device may automatically determine patches to be installed before the server device begins downloading and/or installing the patches. This may result in a more efficient patch installation process because the server device does not have to download unnecessary patches. Although not shown in FIG. 1, the server device may perform a pre-patch check to determine whether various criteria are satisfied prior to requesting one or more patches for installation. Furthermore, the server device may provide, to the patch management device, verification information indicating whether one or more patches were successfully installed. In this way, the patch management device and the server device may automate patch installation from beginning to end.

Figure 2:
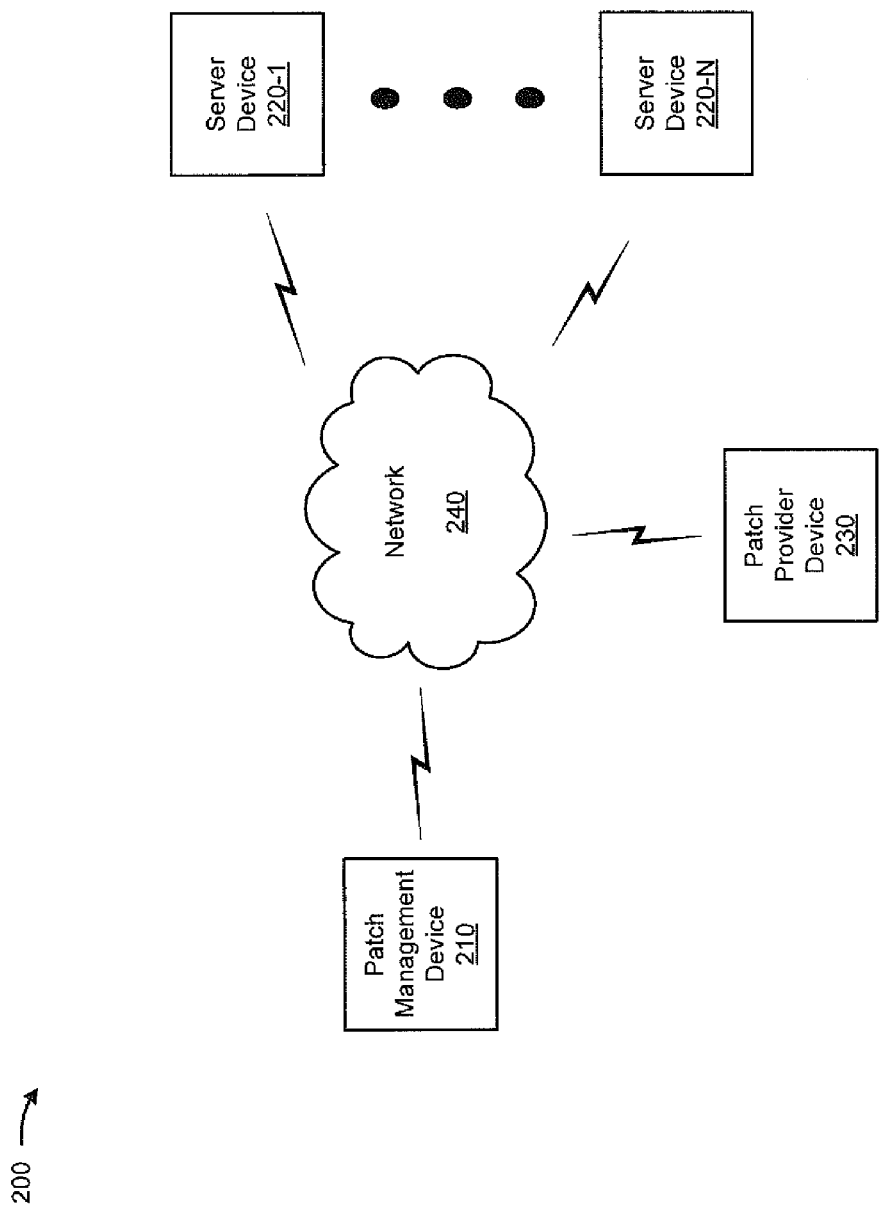
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a patch management device 210, one or more server devices 220-1 through 220-N (N>1) (hereinafter referred to individually as "server device 220," and collectively as "server devices 220"), a patch provider device 230, and a network 240. Devices of environment 200 may interconnect via wired connections, wireless connections, or a combination of wired and wireless connections.

Patch management device 210 may include one or more devices capable of receiving, generating, storing, processing, and/or providing patch information associated with one or more software patches (e.g., information identifying a patch, a patch dependency, a patch obsolescence, a location where a patch may be obtained, etc.). For example, patch management device 210 may include a computing device, such as a desktop computer, a laptop computer, a tablet computer, a mobile device, a server, or a similar device. Patch management device 210 may determine a set of potential patches to be installed on server device 220 (or a group of server devices 220) based on, for example, a master list of patches received from patch provider device 230 and/or a list of patches approved for installation on server device 220. Additionally, or alternatively, patch management device 210 may assist in the installation of patches (e.g., on server device 220). In some implementations, different patch management devices 210 may perform operations associated with patch installation for different server devices 220 and/or different groups of server devices 220.

Server device 220 may include one or more devices capable of receiving, generating, storing, processing, and/or providing patch information. For example, server device 220 may include a computing device, such as a server (e.g., a web server, an application server, a host server, etc.), a desktop computer, a laptop computer, a tablet computer, a mobile device, a network device (e.g., a router, a bridge, a hub, etc.), or a similar device. Server device 220 may determine set of patches to be installed on server device 220 based on a set of potential patches (e.g., received from patch management device 210), and a set of patches already installed on server device 220.

Patch provider device 230 may include one or more devices capable of receiving, generating, storing, processing, and/or providing patch information. For example, patch provider device 230 may include a computing device, such as a server, a desktop computer, or a similar device. Patch provider device 230 may include a device associated with a patch provider (e.g., a software provider), and may provide information that identifies available patches, dependencies between patches, patch obsolescence, or the like.

Network 240 may include one or more wired and/or wireless networks. For example, network 240 may include a cellular network, a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
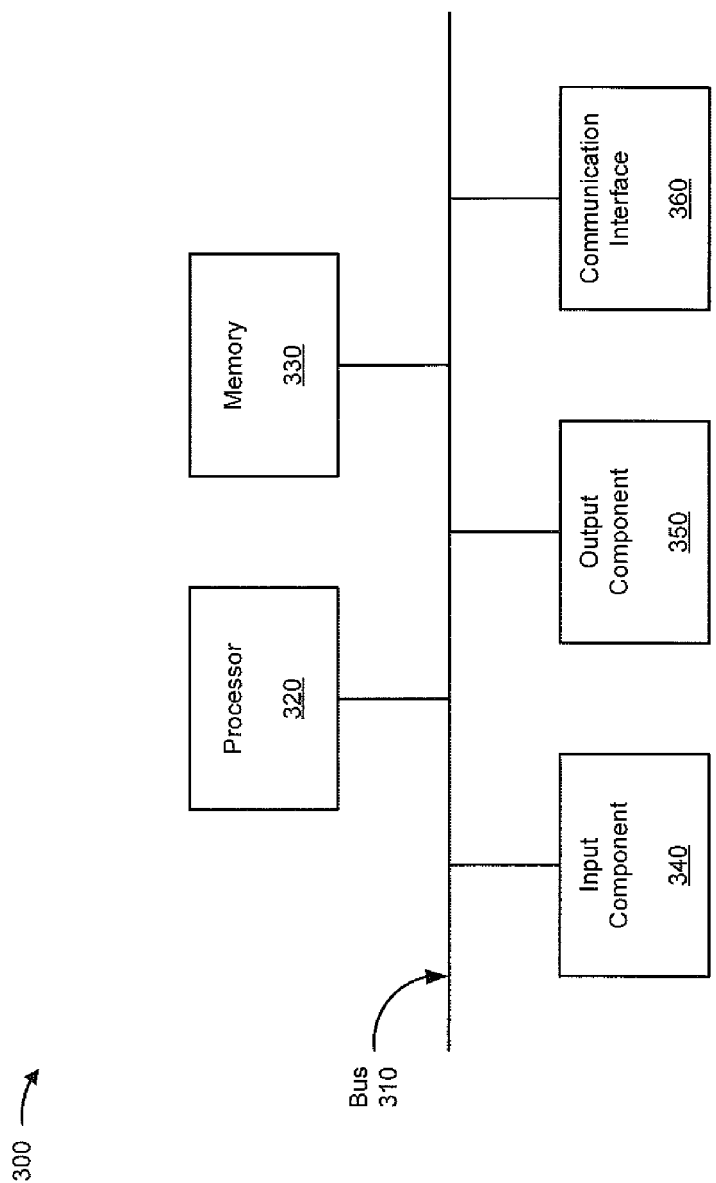
FIG. 3 is a diagram of example components of one or more devices of FIG. 2.

FIG. 3 is a diagram of example components of a device 300. Device 300 may correspond to patch management device 210, server device 220, and/or patch provider device 230. In some implementations, each of patch management device 210, server device 220, and/or patch provider device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4A:
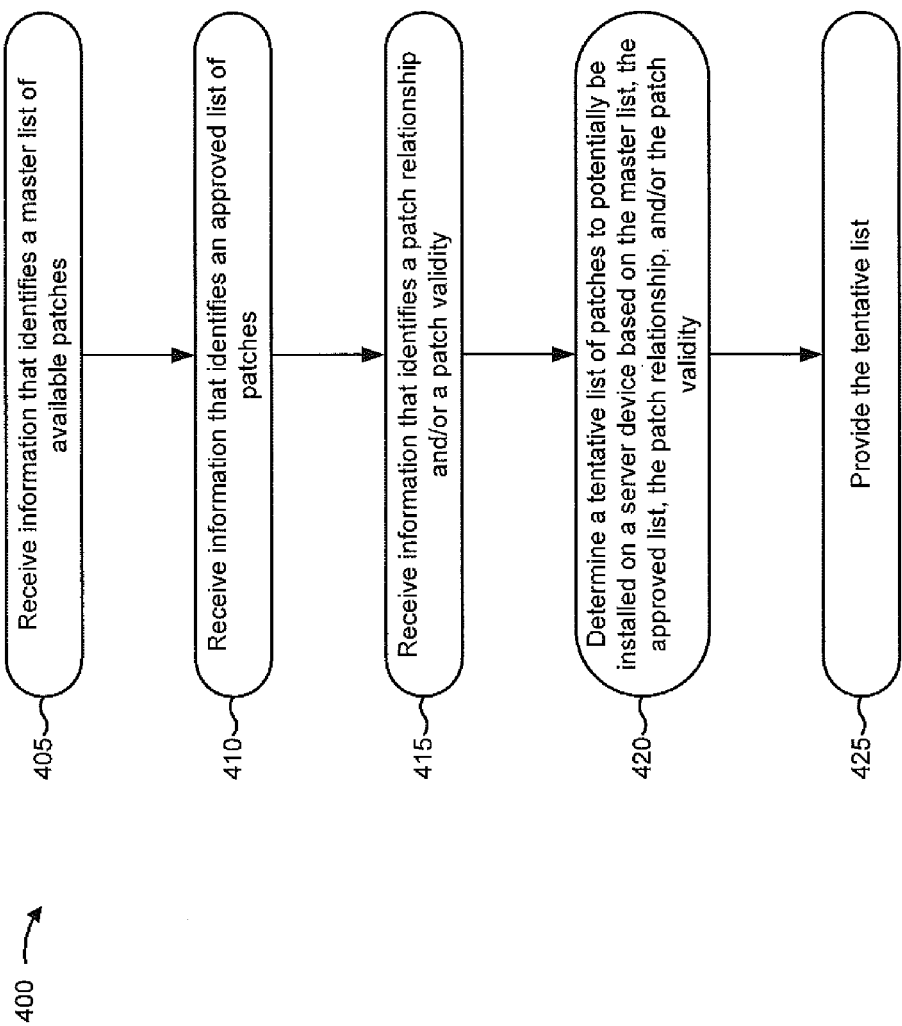
FIGS. 4A and 4B are flow charts of an example process for determining a set of patches to install.
Figure 4B:
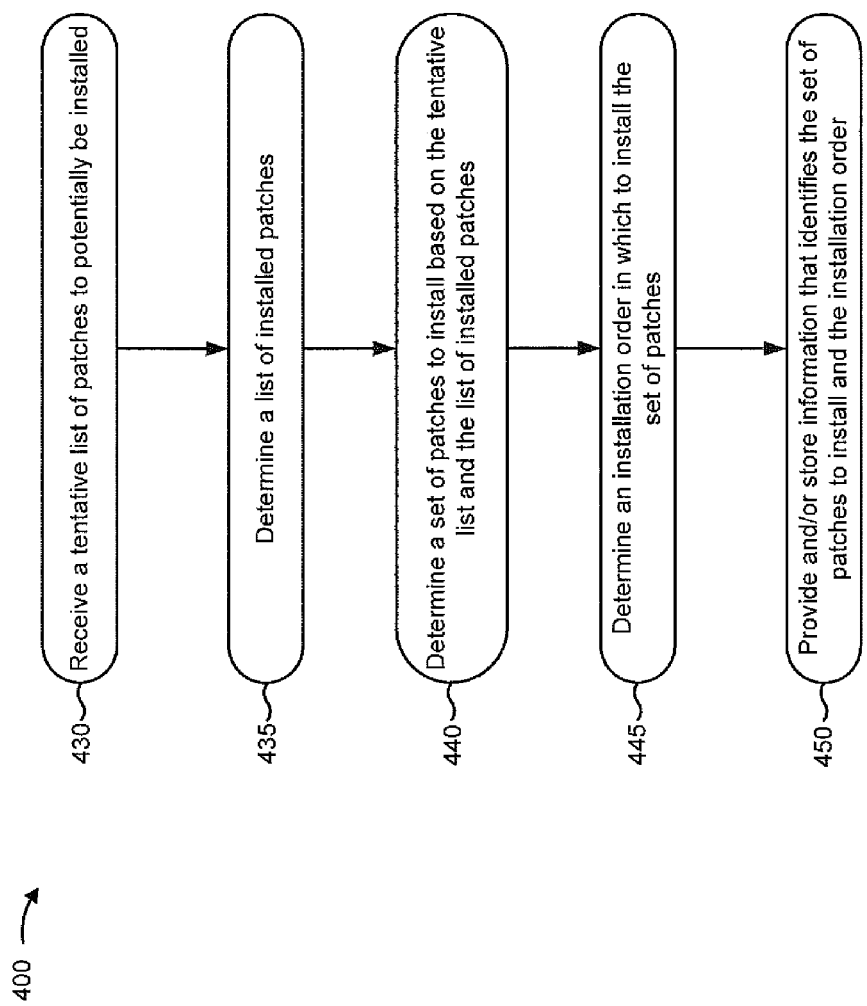

FIGS. 4A and 4B are flow charts of an example process 400 for determining a set of patches to install. In some implementations, one or more process blocks of FIG. 4A may be performed by patch management device 210. Additionally, or alternatively, one or more process blocks of FIG. 4A may be performed by another device or a group of devices separate from or including patch management device 210, such as server device 220 and/or patch provider device 230. In some implementations, one or more process blocks of FIG. 4B may be performed by server device 220. Additionally, or alternatively, one or more process blocks of FIG. 4B may be performed by another device or a group of devices separate from or including server device 220, such as patch management device 210 and/or patch provider device 230.

As shown in FIG. 4A, process 400 may include receiving information that identifies a master list of available patches (block 405). For example, patch management device 210 may receive, from patch provider device 230, information that identifies a master list of available patches. The master list may identify a set of patches that have been released by a software provider associated with patch provider device 230. For example, the master list may identify all patches that have been released, patches that were released as of a particular date, etc. In some implementations, patch management device 210 may request the master list from patch provider device 230, and may receive the master list from patch provider device 230 based on the request.

In some implementations, patch management device 210 may receive patch information, such as a patch identifier (e.g., a patch number, a patch revision number, etc.), a location from which a patch may be obtained (e.g., a location on patch management device 210, a location on patch provider device 230, a network address, a web address, etc.), a date on which a patch was released, a file size of a patch (e.g., a compressed file size, an uncompressed file size), etc.

As further shown in FIG. 4A, process 400 may include receiving information that identifies an approved list of patches (block 410). For example, patch management device 210 may receive a list of approved patches from a service provider associated with patch management device 210 and/or server device 220. The list of approved patches may identify a set of patches that the service provider has approved for installation on server device 220. The list of approved patches may include a subset of the set of patches identified in the master list. In this way, patch management device 210 may prevent unapproved patches from being included in a set of patches to install on server device 220.

As further shown in FIG. 4A, process 400 may include receiving information that identifies a patch relationship and/or a patch validity (block 415). For example, patch management device 210 may receive, via the master list and/or another file received from patch provider device 230, information that identifies a patch relationship between patches included in the master list, and/or a patch validity of a patch included in the master list.

For example, patch management device 210 may receive information that identifies dependencies between patches, such as an indication that a first patch depends on a second patch (e.g., requiring the second patch to be installed before installing the first patch). Additionally, or alternatively, patch management device 210 may receive information that identifies patch obsolescence, such as an indication that a first patch renders a second patch obsolete (e.g., that the second patch is not required to be installed when the first patch is installed). Additionally, or alternatively, patch management device 210 may receive information that identifies whether a particular patch is valid, is invalid, has been withdrawn, etc.

As further shown in FIG. 4A, process 400 may include determining a tentative list of patches to potentially be installed on a server device based on the master list, the approved list, the patch relationship, and/or the patch validity (block 420). For example, patch management device 210 may generate the tentative list by determining patches that are included on both the master list and the approved list. Additionally, or alternatively, patch management device 210 may generate the tentative list by determining patches on the approved list that are not obsolete, invalid, withdrawn, etc.

Patch management device 210 may determine the tentative list based on one or more patch dependencies, in some implementations. As an example, the master list may indicate that a newer patch requires that an older patch be installed before the newer patch is installed, and patch management device 210 may determine that the newer patch is included in the tentative list. In this case, patch management device 210 may add the older patch to the tentative list (e.g., assuming that the older patch is included in the approved list).

Patch management device 210 may determine the tentative list based on one or more patch obsolescence indicators, in some implementations. For example, the master list may indicate that an older patch is rendered obsolete by a newer patch, and thus the older patch need not be installed if the newer patch is installed. In this case, patch management device 210 may exclude the older patch from the tentative list when the newer patch is included in the tentative list. Additionally, or alternatively, patch management device 210 may exclude a patch from the tentative list when the patch is identified as invalid, withdrawn, etc.

In some implementations, patch management device 210 may provide the tentative list for display via a user interface. Patch management device 210 may receive user input to add a patch to the tentative list, to remove a patch from the tentative list, etc. Patch management device 210 may modify the tentative list based on the user input.

As further shown in FIG. 4A, process 400 may include providing the tentative list (block 425). For example, patch management device 210 may provide the tentative list to one or more server devices 220. In some implementations, server device 220 may request the tentative list (e.g., based on a patch installation schedule), and patch management device 210 may provide the tentative list to server device 220 based on the request. Additionally, or alternatively, patch management device 210 may provide the tentative list to server device 220 based on a schedule. In some implementations, patch management device 210 may provide the tentative list to multiple server devices 220.

As shown in FIG. 4B, process 400 may include receiving a tentative list of patches to potentially be installed (block 430). For example, server device 220 may receive the tentative list of patches from patch management device 210. In some implementations, multiple server devices 220 may receive the tentative list and may independently perform (e.g., in parallel) one or more process blocks of FIG. 4B and/or FIG. 6.

As further shown in FIG. 4B, process 400 may include determining a list of installed patches (block 435). For example, server device 220 may determine a list patches that are installed on server device 220. The list of installed patches may identify a set of patches installed on server device 220. Additionally, or alternatively, the list of installed patches may identify patch information associated with one or more installed patches, such as a patch identifier (e.g., a patch number and a revision number).

As further shown in FIG. 4B, process 400 may include determining a set of patches to install based on the tentative list and the list of installed patches (block 440). For example, server device 220 may obtain the tentative list of patches to potentially be installed and the list of installed patches for server device 220, and may use the tentative list and the list of installed patches to determine a set of patches to be installed on server device 220. For example, server device 220 may determine a set of patches, identified in the tentative list, that are not identified in the list of installed patches (e.g., that are not installed on server device 220). In this way, server device 220 may prevent patches that have already been installed on server device 220 from being included in the set of patches to install on server device 220.

Server device 220 may determine the set of patches to install based on one or more patch dependencies, in some implementations. As an example, the tentative list may indicate that a newer patch requires that an older patch be installed before the newer patch is installed, and server device 220 may determine that the newer patch is to be installed on server device 220 (e.g., based on the tentative list and/or the set of patches to be installed). Server device 220 may determine that the older patch has not been installed on server device 220 (e.g., based on the list of installed patches). In this case, server device 220 may include the older patch and the newer patch in the set of patches to be installed. Furthermore, server device 220 may provide an indication that the older patch is to be installed before the newer patch.

Server device 220 may determine the set of patches to install based on one or more patch obsolescence indicators, in some implementations. For example, the tentative list may indicate that an older patch is rendered obsolete by a newer patch, and thus the older patch need not be installed if the newer patch is installed. In this case, server device 220 may exclude the older patch from the set of patches to install when the newer patch is already installed on server device 220 and/or when the newer patch is included in the set of patches to install.

Server device 220 may determine the set of patches to install based on configuration information associated with server device 220, in some implementations. The configuration information may identify a configuration of server device 220, which may impact the set of patches needed by server device 220. The configuration information may identify, for example, software installed on server device 220, a software configuration of server device 220, an operating system installed on server device 220, a device type of server device 220 (e.g., a type of server, such as a Solaris server, an Oracle server, a Linux server; a type of network device; etc.), etc.

As further shown in FIG. 4B, process 400 may include determining an installation order in which to install the set of patches (block 445). For example, server device 220 may determine an installation order for installing the set of patches on server device 220. The installation order may be based on, for example, a dependency between a first patch, included in the set of patches, and a second patch, included in the set of patches. Server device 220 may determine that the second patch depends on the first patch (e.g., requires that the first patch be installed before installing the second patch), and may provide an indication that the first patch is to be installed before the second patch by placing the first patch before the second patch in the installation order.

For patches that do not have a dependency relationship (e.g., that are independent of one another), server device 220 may determine the installation order based on one or more other factors, such as a date on which the patches were released (e.g., older patches may be installed before newer patches, or vice versa), a patch identifier (e.g., an older revision may be installed before a newer revision, or vice versa), a file size (e.g., a compressed file size, an uncompressed file size, etc.) of the patches and/or installation files used to install the patches (e.g., smaller patches may be installed before larger patches, or vice versa), a quantity of software applications impacted by the patches (e.g., patches that impact a smaller number of applications may be installed before patches that impact a larger number of applications, or vice versa), a software application to which the patches apply (e.g., device driver patches, operating system patches, and/or application patches for applications that run on the operating system may be applied in a particular order), etc.

In some implementations, server device 220 may determine the installation order by grouping related patches such that the related patches are installed sequentially. Related patches may include, for example, patches with the same patch identifier and different revision identifiers, patches that apply to the same software application, patches released on the same date and/or within the same period of time, patches with a file size within the same size range, patches obtained from and/or associated with the same software provider, etc.

As further shown in FIG. 4B, process 400 may include providing and/or storing information that identifies the set of patches to install and the installation order (block 450). For example, server device 220 may store the information that identifies the set of patches to install and/or the installation order. Server device 220 may use this information to request, receive, obtain (e.g., download), and/or install the patches (e.g., from patch management device 210 and/or patch provider device 230).

In this way, patch management device 210 and/or server device 220 may determine a set of patches to install on server device 220 before any of the patches are installed. This may increase the efficiency of the patch installation process because patch management device 210 and server device 220 may prevent unnecessary patches from being installed and/or tested for installation on server device 220.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
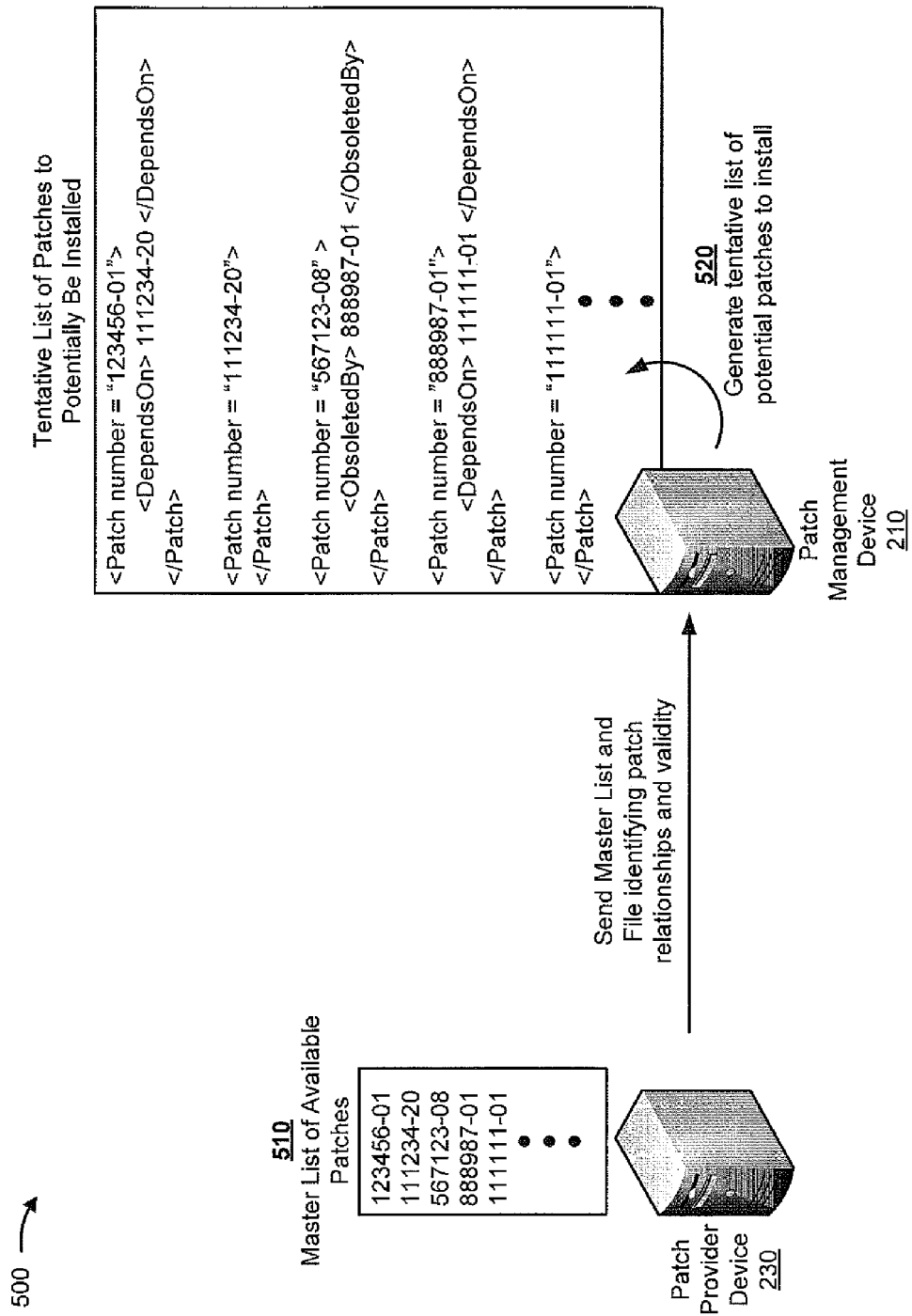
Figure 5C:
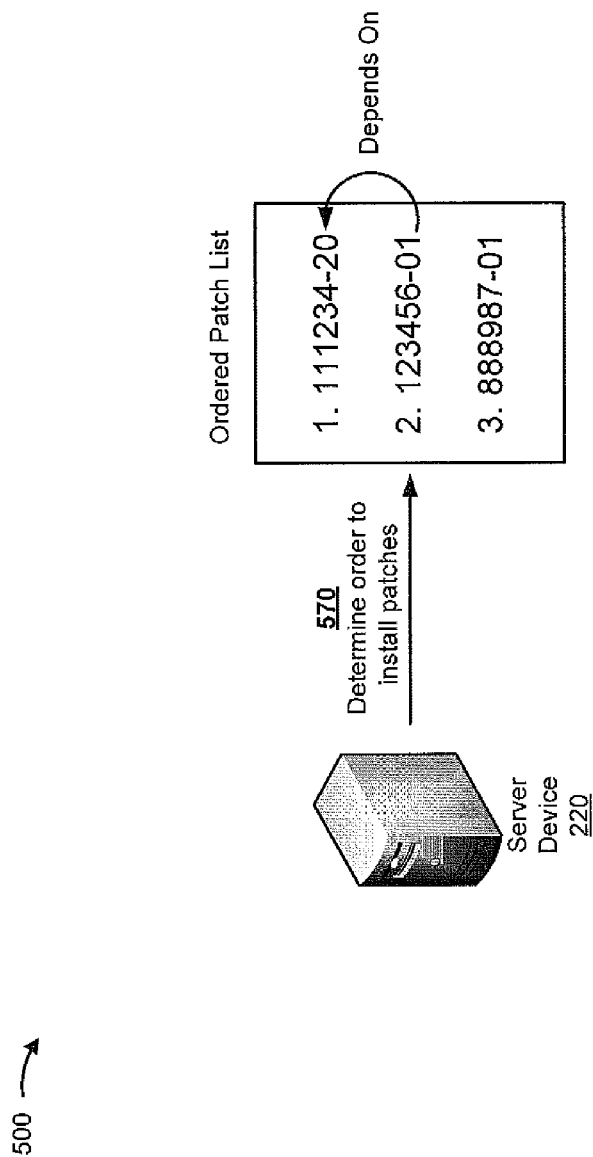

FIGS. 5A-5C are diagrams of an example implementation 500 relating to example process 400 shown in FIGS. 4A and 4B. FIGS. 5A-5C show an example of determining a set of patches to install on server device 220.

As shown in FIG. 5A, and by reference number 510, assume that patch provider device 230 stores a master list of available patches that have been released by a service provider associated with patch provider device 230. As shown, the master list includes a patch with a patch identifier of 123456-01 (e.g., a patch number of 123456, and a revision number of 01), a Patch identified as 111234-20, a patch identified as 567123-08, a patch identified as 888987-01, And a patch identified as 111111-01. As further shown, assume that patch provider device 230 provides, to patch management device 210, the master list and a file that indicates patch dependencies and patch validity.

As shown by reference number 520, assume that patch management device 210 generates a tentative list of patches to potentially be installed by one or more server devices 220. As shown, the tentative list identifies patch 123456-01, which depends on patch 111234-20, which is also included in the tentative list. Furthermore, the tentative list identifies patch 567123-08, which is rendered obsolete by patch 888987-01, which is also included in the tentative list. Patch 888987-01 depends on patch 111111-01, which is also included in the tentative list.

As shown in FIG. 5B, assume that patch management device 210 provides the tentative list to server device 220. As shown by reference number 530, assume that server device 220 determines a list of installed patches that are installed on server device 220. As shown, assume that patch 111111-01 is installed on server device 220.

As shown by reference number 540, server device 220 determines a set of patches to be installed on server device 220 based on the tentative list and the list of installed patches. For example, as shown by reference number 550, assume that server device 220 determines that patch 567123-08 is not to be installed (e.g., is to be excluded from the list of patches to install) because patch 567123-08 is rendered obsolete by patch 888987-01, which is included in the list of patches to install. As another example, server device 220 may determine that patch 567123-08 is not to be installed if patch 888987-01 is already installed on server device 220 (e.g., is included in the list of installed patches). As shown by reference number 560, server device 220 determines that patch 111111-01 is not to be installed because patch 111111-01 is already installed on server device 220.

As shown in FIG. 5C, and by reference number 570, assume that server device 220 determines an installation order in which the patches are to be installed. For example, server device 220 determines an ordered patch list, with patch 111234-20 being placed before patch 123456-01 because patch 123456-01 depends on patch 111234-20. Assume that server device 220 places patch 888987-01 after patches 111234-20 and 123456-01 in the list. For example, patch 888987-01 may be newer than the other patches in the list, may have a larger file size than the other patches in the list, etc.

As indicated above, FIGS. 5A-5C are provided merely as an example. Other examples are possible and may differ from what was described with regard to FIGS. 5A-5C.

FIG. 6 is a flow chart of an example process 600 for managing installation of patches. In some implementations, one or more process blocks of FIG. 6 may be performed by server device 220. Additionally, or alternatively, one or more process blocks of FIG. 6 may be performed by another device or a group of devices separate from or including server device 220, such as patch management device 210 and/or patch provider device 230.

As shown in FIG. 6, process 600 may include receiving information that identifies patches to install and an installation order for installing the patches (block 605). For example, server device 220 may determine a set of patches to install and/or an installation order for installing the patches, as described herein in connection with FIGS. 4A and 4B. Additionally, or alternatively, server device 220 may receive this information from another device (e.g., patch management device 210 may perform the process shown in FIGS. 4A and 4B).

As further shown in FIG. 6, process 600 may include performing a pre-patch check (block 610). For example, server device 220 may perform a pre-patch check prior to installing one or more patches included in the set of patches to be installed. The pre-patch check may include an analysis of server device 220 that ensures that one or more conditions are satisfied prior to installing one or more patches. A condition may include, for example, determining that server device 220 is in a steady operating state (e.g., is not reading and/or writing information associated with a user), determining that server device 220 has a threshold amount of disk space available for installing a patch, verifying a firmware version installed on server device 220, verifying a configuration, checking for a disk error, checking for a patch conflict, verifying a software and/or firmware version, etc.

A condition may be based on the set of patches to be installed, in some implementations. For example, server device 220 may determine whether server device 220 has sufficient disk space available to store a largest patch installation file associated with the set of patches (e.g., a largest uncompressed file), or some threshold based on the largest patch installation file (e.g., a multiple of the largest file size). As another example, server device 220 may determine whether server device 220 has sufficient disk space available to store a particular quantity of largest patch installation files (e.g., the two largest patch installation files), a particular quantity of patch installation files associated with sequential patches to be installed, etc. As another example, server device 220 may determine that a particular patch should only be installed when a particular firmware version is installed on server device 220.

In some implementations, patch management device 210 may obtain pre-patch check information from server device 220, and may compare the pre-patch check information to one or more conditions to determine whether the conditions are satisfied. Additionally, or alternatively, patch management device 210 may provide information identifying the conditions to server device 220, and may provide an instruction, to server device 220, that causes server device 220 to perform the pre-patch check. Server device 220 may compare pre-patch check information to one or more conditions to determine whether the conditions are satisfied. The result may include an indication that all conditions were satisfied, an indication that not all conditions were satisfied, information that identifies one or more particular conditions that were satisfied and/or that were not satisfied, etc.

As further shown in FIG. 6, process 600 may include determining whether the pre-patch check conditions were satisfied (block 615). For example, server device 220 may determine whether the one or more conditions were satisfied by analyzing the pre-patch check information to determine whether the one or more conditions were satisfied.

If the pre-patch check conditions are not satisfied (block 615—NO), then process 600 may include preventing the patches from being installed (block 620). For example, if server device 220 determines that one or more pre-patch check conditions are not satisfied, then server device 220 may prevent the patches from being installed by server device 220.

In some implementations, a condition may apply to all patches in the set of patches to be installed. In this case, server device 220 may require the condition to be satisfied before any patches can be installed by server device 220. In some implementations, a condition may apply to a subset of patches (e.g., fewer than all of the patches included in the set of patches to be installed). In this case, server device 220 may require the condition to be satisfied before the subset of patches can be installed by server device 220, but may permit server device 220 to install other patches (e.g., assuming that the conditions required for the other patches are satisfied). The set of conditions that must be satisfied for the pre-patch check may include conditions that apply to all patches and/or conditions that apply to a subset of patches. In some implementations, patch management device 210 and/or server device 220 may provide a mechanism for a user to provide input to override and/or exclude a pre-patch check condition.

If the pre-patch check conditions are satisfied (block 615—YES), then process 600 may include preparing to install the patches (block 625). For example, server device 220 may prepare to install the patches. Server device 220 may perform an instruction, such as halting execution of one or more processes that may interfere with patch installation, saving backup copies of files that may be affected by patch installation (e.g., login files, configuration files, etc.), creating an undo checkpoint that saves a state of server device 220 so that patch installation may be undone, etc.

As further shown in FIG. 6, process 600 may include requesting a patch to be installed (block 630), and installing the patch (block 635). For example, server device 220 may request a patch from patch management device 210, and patch management device 210 may provide the requested patch to server device 220, which may cause server device 220 to install the patch. The requested patch may be identified in the set of patches to be installed. In some implementations, server device 220 may determine a patch to be installed based on the installation order. For example, a first patch in the order may be requested first, followed by a second patch in the order, a third patch in the order, etc.

In some implementations, server device 220 may obtain (e.g., from patch management device 210 and/or patch provider device 230) patch installation files in the installation order, and may sequentially install the patches. In some implementations, server device 220 may download the patch installation files one at a time, and may not download a second patch installation file until a first patch installation file has been downloaded and/or executed to install a first patch. Server device 220 may delete a patch installation file when the patch associated with that patch installation file has been installed.

As further shown in FIG. 6, process 600 may include determining whether there are more patches to install (block 640). For example, server device 220 may determine whether there are more patches to install based on the information that identifies the set of patches to install (e.g., the ordered patch list).

If there are more patches to install (block 640—YES), then process 600 may include requesting a next patch based on the installation order (block 645), and installing the next patch (e.g., returning to block 635). For example, server device 220 may determine that a first patch has been downloaded and/or installed. Based on receiving the indication, server device 220 may obtain, from patch management device 210, a second patch (e.g., a second patch installation file) and/or information that identifies a location where the second patch may be obtained.

In some implementations, when server device 220 finishes downloading a first patch installation file, server device 220 may begin installing the first patch, and may also begin downloading a second patch installation file. In this way, server device 220 may install a first patch and download a second patch concurrently. When server device 220 has finished installing a patch, server device 220 may delete a patch installation file corresponding to that patch. In this way, server device 220 may save disk space by sequentially downloading, executing, and deleting patch installation files.

In some implementations, server device 220 may receive information that identifies a quantity of patch installation files that may be downloaded concurrently, a quantity of independent patches that may be installed concurrently, etc. Server device 220 may control the installation process based on this information.

If there are no more patches to install (block 640—NO), then process 600 may include verifying patch installation and performing a cleanup operation (block 650). For example, patch management device 210 and/or server device 220 may verify that the set of patches were successfully installed. For example, server device 220 may execute a test program to verify that a patch was successfully installed. Server device 220 may provide log information to patch management device 210 based on the verification. The log information may identify, for example, patches that were installed successfully, patches that were not installed successfully, error messages associated with patch installation, etc. In some implementations, patch management device 210 and/or server device 220 may provide the log information for display, such as by generating a web page to display the log information.

Server device 220 may perform a cleanup operation, in some implementations. Server device 220 may perform a cleanup operation by, for example, rebooting, permitting users to access server device 220, deleting temporary information used for the patch installation process, etc. Using the above process, patch installation may be made more efficient, saving memory space, bandwidth, and other computing resources.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
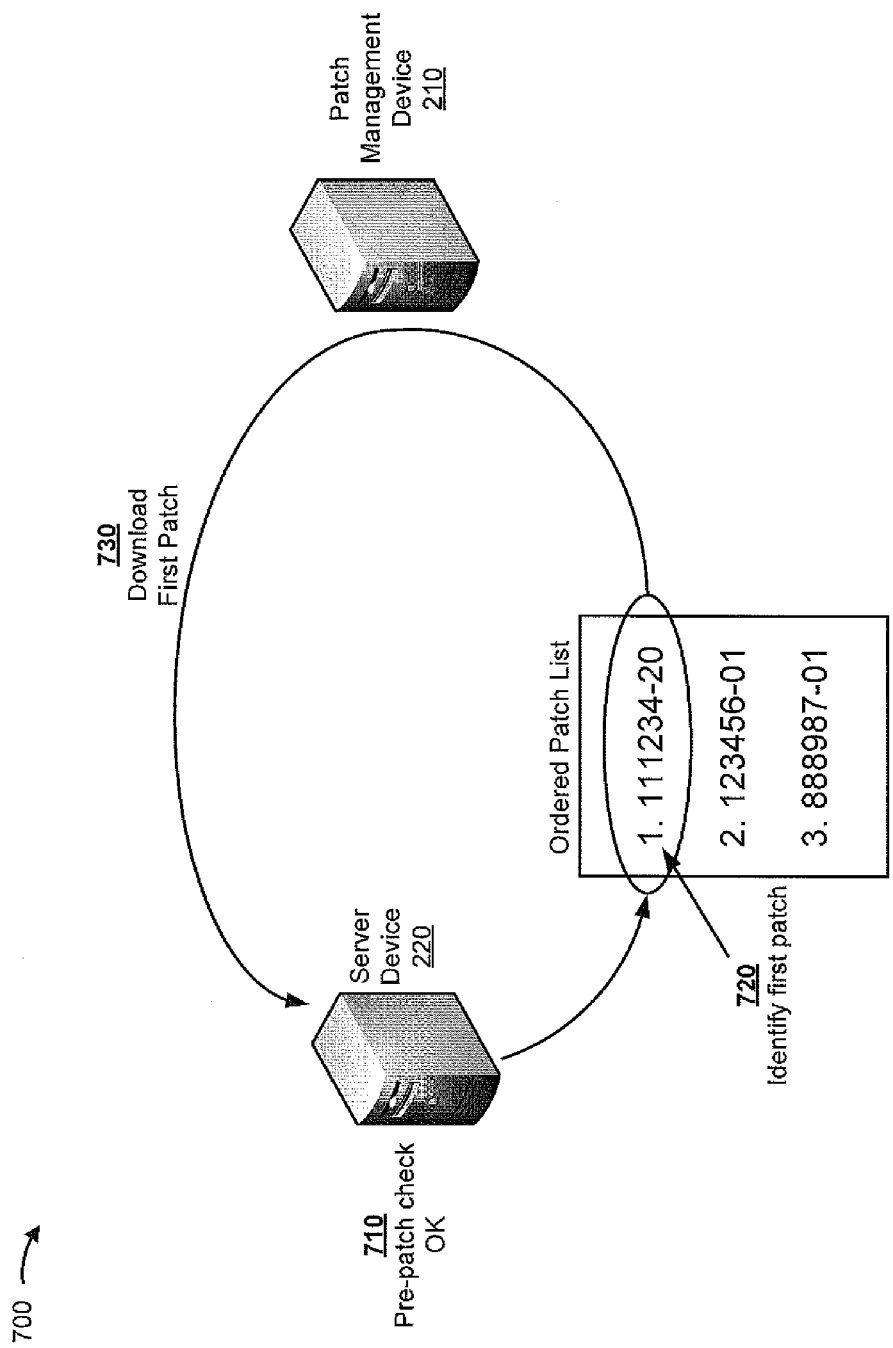
FIGS. 7A-7C are diagrams of an example implementation relating to the example process shown in FIG. 6.
Figure 7B:
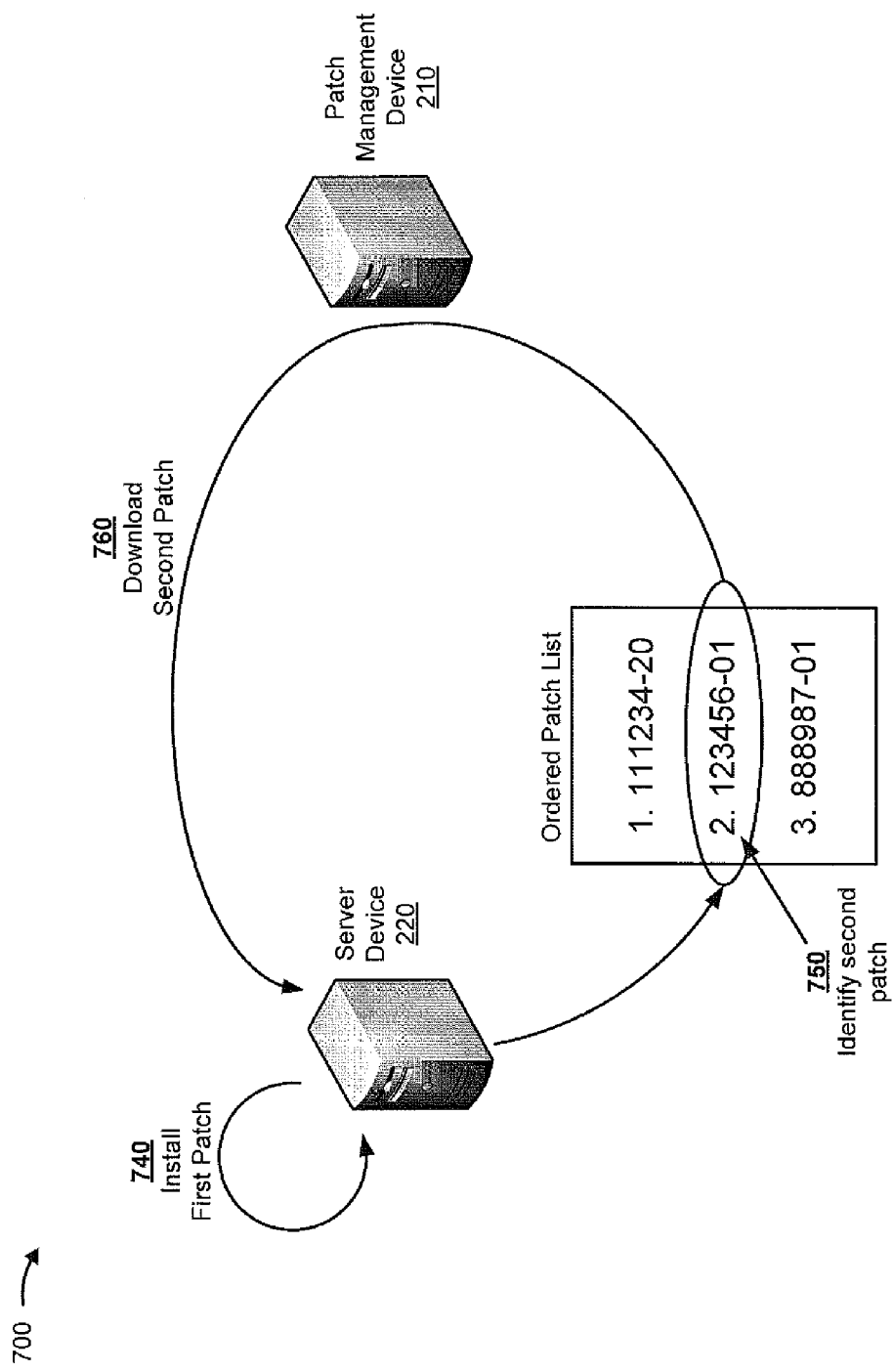
Figure 7C:
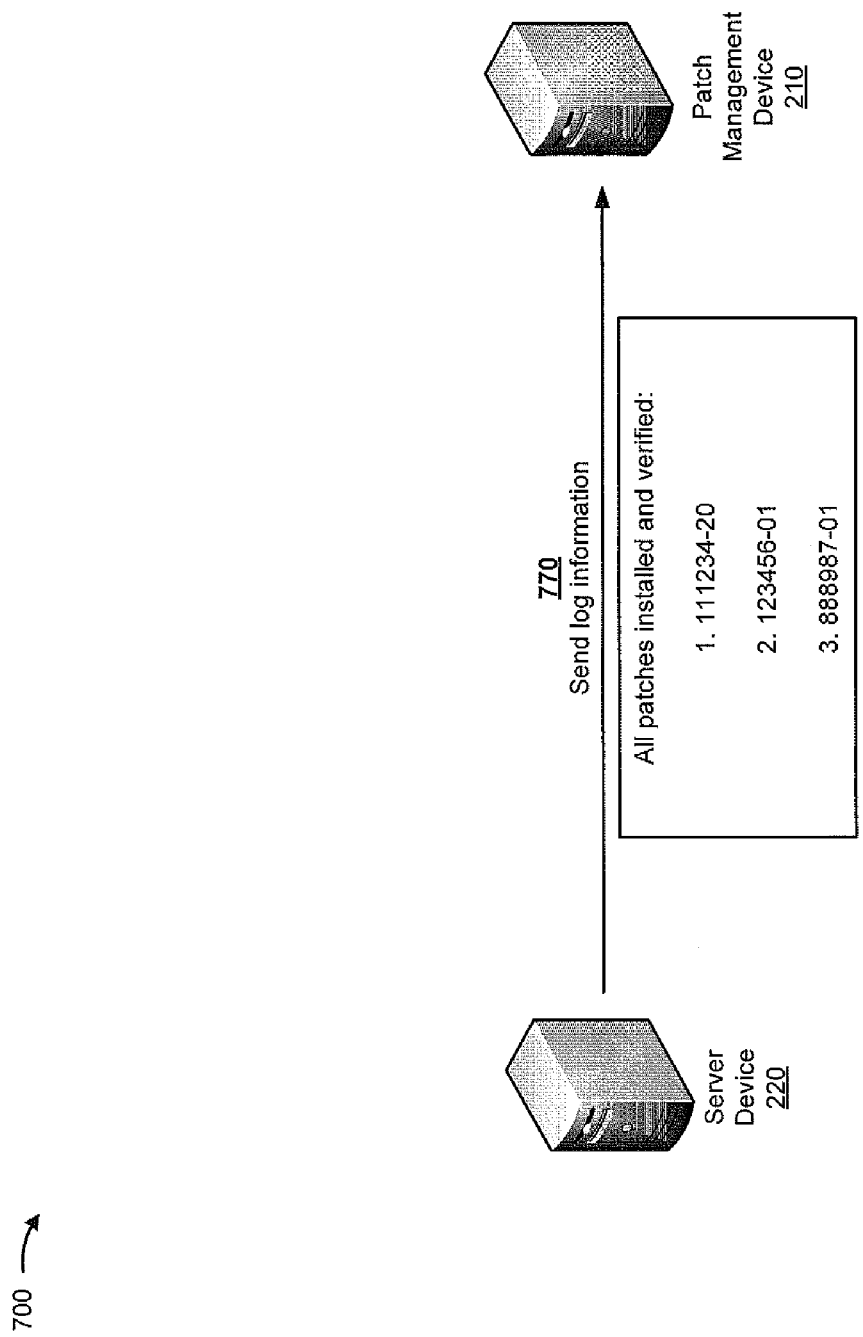

FIGS. 7A-7C are diagrams of an example implementation 700 relating to example process 600 shown in FIG. 6. FIGS. 7A-7C show an example of managing patch installation using an ordered patch list.

As shown in FIG. 7A, assume that server device 220 determines an ordered patch list (e.g., in an Extensible Markup Language (XML) file) that identifies three patches to be installed: patch 111234-20, patch 123456-01, and patch 888987-01. As shown by reference number 710, assume that server device 220 performs a pre-patch check, and determines that a set of conditions, identified in pre-patch check information, are satisfied. As shown by reference number 720, server device 220 identifies the first patch included in the ordered patch list, shown as patch 111234-20, and requests the first patch from patch management device 210.

In some implementations, the ordered patch list may identify a location from which server device 220 may obtain the first patch. In example implementation 700, assume that the location identifies patch management device 210 (e.g., using an address, such as a network address, a web address, etc.). In some implementations, the location may identify another device, such as patch provider device 230. As shown by reference number 730, server device 220 may download the first patch from patch management device 210.

As shown in FIG. 7B, and by reference number 740, server device 220 may install the first patch once the first patch (e.g., a patch installation file corresponding to the first patch) has been downloaded. As shown by reference number 750, assume that server device 220 identifies a second patch, shown as patch 123456-01, while the first patch is installing. Further, as shown by reference number 760, assume that server device 220 downloads the second patch while the first patch is installing. Assume that server device 220 continues downloading and installing patches in this manner until all patches have been installed.

As shown in FIG. 7C, and by reference number 770, assume that server device 220 sends log information to patch management device 210 once all patches have been installed. As shown, the log information indicates that all patches were successfully installed and verified.

As indicated above, FIGS. 7A-7C are provided merely as an example. Other examples are possible and may differ from what was described with regard to FIGS. 7A-7C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
one or more processors to:

receive information that identifies a set of available patches that have been released by a software provider, the information further identifying a set of dependencies between available patches included in the set of available patches;

receive information that identifies a set of installed patches that have been installed on a particular device;

determine a set of patches to be installed on the particular device based on the set of available patches and the set of installed patches;

determine an installation order for installing the set of patches on the particular device, the installation order being based on a dependency, included in the set of dependencies, between at least two patches included in the set of patches to be installed;

perform a pre-patch check to determine whether a set of conditions, associated with the set of patches, are satisfied, when performing the pre-patch check, determine, based on the set of patches, whether a particular firmware version is installed on the particular device; and cause installation of the set of patches on the particular device, in an order identified by the installation order, after determining the set of patches to be installed and based on performing the pre-patch check.

2. The device of claim 1, where the one or more processors are further to:

receive an obsolescence indicator that indicates that a first patch, included in the set of available patches, is rendered obsolete by a second patch included in the set of available patches; and where the one or more processors, when determining the set of patches to be installed, are further to:
determine the set of patches to be installed based on the obsolescence indicator.

3. The device of claim 2, where the one or more processors are further to:

determine that the second patch is included in the set of installed patches; and exclude the first patch and the second patch from the set of patches to be installed based on determining that the second patch is included in the set of installed patches.

4. The device of claim 1, where the one or more processors, when causing installation of the set of patches, are further to:

cause a first installation file, associated with a first patch included in the set of patches, to be obtained by the particular device;

cause the first patch to be installed via execution of the first installation file; and cause a second installation file, associated with a second patch, included in the set of patches, that succeeds the first patch in the installation order, to be obtained by the particular device after the first installation file has been obtained and while the first patch is being installed.

5. The device of claim 1, where the one or more processors, when determining the set of patches to be installed, are further to:

compare the set of available patches to the set of installed patches;

determine a subset of patches, included in the set of available patches, that are not included in the set of installed patches; and determine the set of patches to be installed based on the subset of patches.

6. The device of claim 1, where the one or more processors are further to:

determine a first patch, included in the set of patches to be installed, and a second patch, included in the set of patches to be installed, that are independent of one another; and where the one or more processors, when determining the installation order, are further to:

determine the installation order based on at least one of:

a first release date associated with the first patch and a second release date associated with the second patch, or a first file size associated with the first patch and a second file size associated with the second patch.

7. The device of claim 1, where the one or more processors, when causing installation of the set of patches on the particular device, are further to:

cause installation of the set of patches on the particular device based on determining that the particular firmware version is installed on the particular device.

8. A computer-readable medium storing instructions, the instructions comprising:

one or more instructions that, when executed by one or more processors, cause the one or more processors to:

receive information that identifies a first set of patches that have been identified for installation on a particular device, receive information that identifies a dependency between at least two patches included in the first set of patches;

receive information that identifies a second set of patches that have been installed on the particular device;

compare the first set of patches and the second set of patches;

determine a third set of patches, that includes the at least two patches, to be installed on the particular device based on comparing the first set of patches and the second set of patches, the third set of patches being different from the first set of patches and the second set of patches;

determine an installation order for installing the third set of patches on the particular device, the installation order being based on the dependency between the at least two patches;

perform a pre-patch check to determine whether a set of conditions, based on the third set of patches, are satisfied, when performing the pre-patch check, determine, based on the third set of patches, whether a particular firmware version is installed on the particular device; and cause installation, on the particular device, of the third set of patches based on determining the third set of patches, based on the installation order, and based on performing the pre-patch check.

9. The computer-readable medium of claim 8, where the one or more instructions, when executed by the one or more processors, further cause the one or more processors to:

receive information that indicates that a first patch, included in the first set of patches, is rendered obsolete by a second patch included in the first set of patches; and where the one or more instructions, that cause the one or more processors to determine the third set of patches, further cause the one or more processors to:

determine the third set of patches based on the information that indicates that the first patch is rendered obsolete by the second patch.

10. The computer-readable medium of claim 9, where the one or more instructions, when executed by the one or more processors, further cause the one or more processors to:

determine that the first patch and the second patch are included in the third set of patches; and remove the first patch from the third set of patches based on determining that the first patch and the second patch are included in the third set of patches.

11. The computer-readable medium of claim 8, where the one or more instructions, that cause the one or more processors to cause installation of the third set of patches, further cause the one or more processors to:

cause a first installation file, associated with a first patch included in the third set of patches, to be obtained by the particular device;

cause the first patch to be installed via execution of the first installation file; and cause a second installation file, associated with a second patch that follows the first patch in the installation order, to be obtained by the particular device after the first installation file has been obtained and while the first patch is being installed.

12. The computer-readable medium of claim 8, where the one or more instructions, that cause the one or more processors to cause installation of the third set of patches, further cause the one or more processors to:

cause installation of the third set of patches when the set of conditions are satisfied.

13. The computer-readable medium of claim 8, where the one or more instructions, when executed by the one or more processors, further cause the one or more processors to:

obtain log information, associated with the installation of the third set of patches, after the third set of patches has been installed.

14. The computer-readable medium of claim 8, where the one or more instructions, when executed by the one or more processors, further cause the one or more processors to:

determine configuration information associated with the particular device; and where the one or more instructions, that cause the one or more processors to determine the third set of patches, further cause the one or more processors to:

determine the third set of patches based on the configuration information.

15. A method, comprising:

receiving, by a device, information that identifies a first set of patches that have been released by a software provider;

receiving, by the device, information that identifies a set of dependencies between available patches included in the first set of patches;

receiving, by the device, information that identifies a second set of patches that have been installed on a particular device;

determining, by the device, a third set of patches to be installed on the particular device based on the first set of patches and the second set of patches;

determining, by the device, an installation order for installing the third set of patches on the particular device, the installation order being based on a dependency, included in the set of dependencies, between at least two patches included in the third set of patches;

performing, by the device, a pre-patch check to determine whether a set of conditions, associated with the particular device, is satisfied, performing the pre-patch check including determining, based on the third set of patches, whether a particular firmware version is installed on the particular device; and selectively causing, by the device, installation of the third set of patches on the particular device, in a sequence identified by the installation order, after determining the third set of patches and based on performing the pre-patch check.

16. The method of claim 15, further comprising:

receiving information that indicates that a first patch, included in the first set of patches, is rendered obsolete by a second patch included in the first set of patches; and where determining the third set of patches further comprises:

determining the third set of patches based on the information that indicates that the first patch is rendered obsolete by the second patch.

17. The method of claim 15, where causing installation of the third set of patches further comprises:

causing a first installation file, associated with a first patch included in the third set of patches, to be obtained by the particular device;

causing the first patch to be installed on the particular device via execution of the first installation file; and causing the first installation file to be deleted from the particular device after the first patch has been installed on the particular device.

18. The method of claim 15, further comprising:

receiving information that identifies a fourth set of patches that have been approved for installation on the particular device, the fourth set of patches including a subset of the first set of patches;

comparing the fourth set of patches and the second set of patches that have been installed on the particular device; and where determining the third set of patches further comprises:

determining the third set of patches based on comparing the fourth set of patches and the second set of patches.

19. The method of claim 15, further comprising:

determining that all patches, included in the third set of patches, have been installed on the particular device; and obtaining log information, associated with the installation of the third set of patches, based on determining that all patches have been installed.

20. The method of claim 15, further comprising:

determining the set of conditions based on the third set of patches; and where performing the pre-patch check further comprises:

performing the pre-patch check based on the determined set of conditions.

* * * * *